United States Patent
Chen et al.

(10) Patent No.: US 11,172,416 B2
(45) Date of Patent: *Nov. 9, 2021

(54) METHOD FOR ACCESSING NETWORK BY USER EQUIPMENT, AND ACCESS DEVICE

(71) Applicant: HUAWEI TECHNOLOGIES CO., LTD., Guangdong (CN)

(72) Inventors: Xiao Chen, Shenzhen (CN); Tianle Deng, Shenzhen (CN); Hongzhuo Zhang, Shanghai (CN); Li Yang, Reading (GB)

(73) Assignee: Huawei Technologies Co., Ltd., Guangdong (CN)

( * ) Notice: Subject to any disclaimer, the term of this patent is extended or adjusted under 35 U.S.C. 154(b) by 87 days.

This patent is subject to a terminal disclaimer.

(21) Appl. No.: 16/518,402

(22) Filed: Jul. 22, 2019

(65) Prior Publication Data

US 2019/0349823 A1   Nov. 14, 2019

Related U.S. Application Data

(63) Continuation of application No. 15/917,104, filed on Mar. 9, 2018, now Pat. No. 10,419,986, which is a
(Continued)

(51) Int. Cl.
*H04W 72/04* (2009.01)
*H04W 36/00* (2009.01)
(Continued)

(52) U.S. Cl.
CPC ....... *H04W 36/0077* (2013.01); *H04W 76/28* (2018.02); *H04W 36/14* (2013.01); *H04W 88/06* (2013.01)

(58) Field of Classification Search
CPC . H04W 36/0077; H04W 76/28; H04W 36/14; H04W 88/06
See application file for complete search history.

(56) References Cited

U.S. PATENT DOCUMENTS 9,609,602 B2   3/2017   Jain et al.
9,629,068 B2   4/2017   Adachi
(Continued)

FOREIGN PATENT DOCUMENTS

CN   101431780 A   5/2009
CN   101577946 A   11/2009
(Continued)

OTHER PUBLICATIONS

Summons to attend oral proceedings pursuant to Rule 115(1) EPC issued in European Application No. 13885135.7 on Nov. 22, 2019, 13 pages.
(Continued)

*Primary Examiner* — Jay P Patel
(74) *Attorney, Agent, or Firm* — Fish & Richardson P.C.

(57) ABSTRACT

Embodiments of the present disclosure provide a method for accessing a network by a user equipment (UE), and an access device. The method includes: sending, by a source side access device, an access indication message to a UE, where the access indication message is used to instruct the UE to access a target side access device; or sending, by a source side access device, a first notification message to a target side access device, where the first notification message is used to instruct the target side access device to send, to a UE, access information used to instruct the UE to access the target side access device; and in a process in which the UE accesses the target side access device, maintains a connection between the UE and the source side access device.

19 Claims, 7 Drawing Sheets

Related U.S. Application Data continuation of application No. 14/947,398, filed on Nov. 20, 2015, now Pat. No. 9,942,809, which is a continuation of application No. PCT/CN2013/076113, filed on May 22, 2013.

(51) Int. Cl.
*H04W 76/28* (2018.01)
*H04W 36/14* (2009.01)
*H04W 88/06* (2009.01)

(56) References Cited

U.S. PATENT DOCUMENTS

| | | | |
|---|---|---|---|
| 10,412,649 B2* | 9/2019 | Lee | H04W 36/14 |
| 2008/0268845 A1 | 10/2008 | Wu et al. | |
| 2008/0305793 A1 | 12/2008 | Gallagher et al. | |
| 2009/0042576 A1 | 2/2009 | Mukherjee et al. | |
| 2009/0129342 A1 | 5/2009 | Hwang et al. | |
| 2009/0316656 A1 | 12/2009 | Zhao et al. | |
| 2010/0020767 A1 | 1/2010 | Kumai et al. | |
| 2010/0022250 A1 | 1/2010 | Petrovic et al. | |
| 2010/0142483 A1 | 6/2010 | Wu et al. | |
| 2010/0227617 A1 | 9/2010 | Jung et al. | |
| 2011/0090873 A1 | 4/2011 | Lee et al. | |
| 2011/0105121 A1 | 5/2011 | Kazmi et al. | |
| 2011/0281586 A1 | 11/2011 | Yu et al. | |
| 2012/0263145 A1* | 10/2012 | Marinier | H04W 4/023 370/331 |
| 2013/0107863 A1 | 5/2013 | Faccin et al. | |
| 2013/0170474 A1* | 7/2013 | Bi | H04W 72/042 370/332 |
| 2014/0004863 A1 | 1/2014 | Zhang et al. | |
| 2014/0016614 A1 | 1/2014 | Velev et al. | |
| 2014/0079022 A1* | 3/2014 | Wang | H04W 36/22 370/331 |
| 2014/0177590 A1 | 6/2014 | Sirotkin et al. | |
| 2014/0204927 A1* | 7/2014 | Horn | H04W 8/06 370/338 |
| 2014/0287757 A1 | 9/2014 | Borg et al. | |
| 2015/0043472 A1 | 2/2015 | Seo et al. | |
| 2015/0181481 A1 | 6/2015 | Masini et al. | |
| 2015/0223284 A1 | 8/2015 | Jain et al. | |
| 2015/0350968 A1 | 12/2015 | Silva et al. | |
| 2016/0029282 A1 | 1/2016 | Lee et al. | |
| 2016/0112896 A1* | 4/2016 | Karampatsis | H04W 28/0289 370/230.1 |
| 2016/0212638 A1 | 7/2016 | Jain et al. | |
| 2018/0220327 A1* | 8/2018 | Karampatsis | H04L 47/32 |
| 2019/0349823 A1* | 11/2019 | Chen | H04W 76/28 |

FOREIGN PATENT DOCUMENTS

| | | | | |
|---|---|---|---|---|
| CN | 101801055 A | 8/2010 | | |
| CN | 102469557 A | 5/2012 | | |
| CN | 102217392 B | 8/2013 | | |
| EP | 1871126 A1 | 12/2007 | | |
| WO | WO2011137784 A1 | 11/2011 | | |
| WO | 2013024054 A1 | 2/2013 | | |
| WO | WO-2013161233 A1 * | 10/2013 | | H04W 76/22 |
| WO | WO-2013181843 A1 * | 12/2013 | | H04W 76/12 |

OTHER PUBLICATIONS

R2-131886—Ericsson et al., "WLAN/3GPP Radio Interworking-More on IDLE and Connected mode," 3GPP TSG-RAN WG2 #82, Fukuoka, Japan, XP050699917, May 20-24, 2013, 10 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012), 175 pages.

"3rd Generation Partnership Project; Technical Specification Group Radio Access Network; Evolved Universal Terrestrial Radio Access Network (E-UTRAN); X2 application protocol (X2AP)(Release 11 )," 3GPP TS 36.423 V11.4.0 Mar. 2013), 144 pages.

Office Action issued in Chinese Application No. 201910373016.X dated Dec. 3, 2020, 8 pages.

\* cited by examiner

METHOD FOR ACCESSING NETWORK BY USER EQUIPMENT, AND ACCESS DEVICE

CROSS-REFERENCE TO RELATED APPLICATIONS

This application is a continuation of U.S. patent application Ser. No. 15/917,104, filed on Mar. 9, 2018, which is a continuation of U.S. patent application Ser. No. 14/947,398, filed on Nov. 20, 2015, which is a continuation of International Application No. PCT/CN2013/076113, filed on May 22, 2013. All of the afore-mentioned patent applications are hereby incorporated by reference in their entireties.

TECHNICAL FIELD

Embodiments of the present invention relate to the field of communications technologies, and in particular, to a method for accessing a network by a piece of user equipment, and an access device.

BACKGROUND

Currently, as intelligent terminals and mobile applications develop rapidly, it is getting more difficult for a live network to satisfy an increasing data volume requirement. With wide deployment of a wireless local area network (WLAN for short below), hotspot covered areas gradually increase; however, during inter-system bearer handover in a 3rd generation mobile communications network (3GPP for short below), for example, a piece of user equipment (User Equipment, UE for short below) is handed over from a 3GPP network to a WLAN, or a UE is handed over from a WLAN to a 3GPP network, during the handover, the UE disconnects a connection between the UE and a source side access device, and re-accesses a target side access device. In the handover process, the UE transfers all bearers of the source side access device to the target side access device.

However, in the foregoing handover process, a service interruption is easily caused, and normal running of a service is affected.

SUMMARY

Embodiments of the present invention provide a method for accessing a network by a piece of user equipment, and an access device, so as to resolve a problem that in an inter-system bearer handover process, a service interruption is easily caused and therefore normal running of a service is affected.

According to a first aspect, an embodiment of the present invention provides a method for accessing a network by a piece of user equipment, including:
sending, by a source side access device, an access indication message to a piece of user equipment UE, where the access indication message is used to instruct the UE to access the target side access device; or sending, by the source side access device, a first notification message to a target side access device, where the first notification message is used to instruct the target side access device to send, to the UE, access information used to instruct the UE to access the target side access device; and
in a process in which the UE accesses the target side access device, maintaining, by the source side access device, a connection between the UE and the source side access device, where the connection between the UE and the source side access device includes a control plane connection between the UE and the source side access device or a user plane connection between the UE and the source side access device.

In a first possible implementation manner of the first aspect, before the sending, by a source side access device, an access indication message to the UE, the method further includes:
receiving, by the source side access device, the access indication message sent by a centralized control node.

With reference to the first aspect or the first possible implementation manner of the first aspect, in a second possible implementation manner of the first aspect, the access indication message includes: information used to indicate an access feature of the target side access device and information used to indicate a resource reserved by the target side access device for the UE.

With reference to the method according to any one of the first aspect to the second possible implementation manner of the first aspect, in a third possible implementation manner of the first aspect, the access indication message is further used to: after the UE accesses the target side access device, instruct the UE to maintain the connection between the UE and the source side access device, or disconnect the connection between the UE and the source side access device.

With reference to the method according to any one of the first aspect to the third possible implementation manner of the first aspect, in a fourth possible implementation manner of the first aspect, the method further includes:
sending, by the source side access device, a first bearer transfer message to the UE, where the first bearer transfer message carries a bearer identifier of a bearer between the UE and the source side access device, and the bearer identifier is used to instruct the UE to transfer a bearer corresponding to the bearer identifier to the target side access device.

With reference to the method according to any one of the first aspect to the third possible implementation manner of the first aspect, in a fifth possible implementation manner of the first aspect, the method further includes:
sending, by the source side access device, a bearer identifier of a bearer between the UE and the source side access device to the target side access device, where the bearer identifier of the bearer between the UE and the source side access device is used to instruct the target side access device to send a second bearer transfer message to the UE, where the second bearer transfer message is used to instruct the UE to transfer a bearer corresponding to the bearer identifier to the target side access device.

With reference to the method according to any one of the first aspect to the fifth possible implementation manner of the first aspect, in a sixth possible implementation manner of the first aspect, the access indication message is further used to: after the UE accesses the target side access device, instruct the UE to enter a discontinuous reception DRX mode.

According to a second aspect, an embodiment of the present invention provides a method for accessing a network by a piece of user equipment, including:
receiving, by a piece of user equipment UE, an access indication message sent by a source side access device, where the access indication message is used to instruct the UE to access the target side access device; or receiving, by the UE, access information that is sent by the target side access device and used to instruct the UE to access the target side access device; and accessing, by the UE, the target side access device according to the access indication message or the access information, where in a process in which the UE accesses the target side access device, the UE maintains a connection between the UE and the source side access device, where the connection between the UE and the source side access device includes a control plane connection between the UE and the source side access device or a user plane connection between the UE and the source side access device.

In a first possible implementation manner of the second aspect, before the receiving, by a piece of user equipment UE, an access indication message sent by a source side access device, the method further includes:

detecting, by the UE, the target side access device; and reporting, by the UE, a first discovery message to the source side access device, where the first discovery message is used to indicate the target side access device detected by the UE.

With reference to the second aspect or the first possible implementation manner of the second aspect, in a second possible implementation manner of the second aspect, the access indication message includes: information used to indicate an access feature of the target side access device and information used to indicate a resource reserved by the target side access device for the UE.

With reference to the method according to any one of the second aspect to the second possible implementation manner of the second aspect, in a third possible implementation manner of the second aspect, the access indication message is further used to: after the UE accesses the target side access device, instruct the UE to maintain the connection between the UE and the source side access device, or disconnect the connection between the UE and the source side access device.

With reference to the third possible implementation manner of the second aspect, in a fourth possible implementation manner of the second aspect, if the indication information is used to: after the UE accesses the target side access device, instruct to disconnect the connection between the UE and the source side access device, after the accessing, by the UE, the target side access device, the method further includes:

disconnecting, by the UE, the connection between the UE and the source side access device.

With reference to the method according to any one of the second aspect to the fourth possible implementation manner of the second aspect, in a fifth possible implementation manner of the second aspect, the method further includes:

receiving, by the UE, a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device; or receiving, by the UE, a second bearer transfer message sent by the target side access device, where the second bearer transfer message is used to instruct the UE to transfer a bearer corresponding to a bearer identifier to the target side access device.

With reference to the method according to any one of the second aspect to the fourth possible implementation manner of the second aspect, in a sixth possible implementation manner of the second aspect, the method further includes:

sending, by the UE, a traffic flow template TFT, a procedure transaction identifier PTI, and a bearer identifier of a bearer between the UE and the source side access device to the source side access device, where the TFT, the PTI, and the bearer identifier of the bearer between the UE and the source side access device are used by the source side access device to stop using a bearer that corresponds to the bearer identifier of the bearer between the UE and the source side access device to exchange data with the UE.

With reference to the method according to any one of the second aspect to the sixth possible implementation manner of the second aspect, in a seventh possible implementation manner of the second aspect, the access indication message is further used to: after the UE accesses the target side access device, instruct the UE to enter a discontinuous reception DRX mode, and the method further includes:

entering, by the UE, the DRX mode according to the access indication message to exchange data with the source side access device, or exchange data with the target side access device.

According to a third aspect, an embodiment of the present invention provides a method for accessing a network by a piece of user equipment, including:

sending, by a centralized control node, an access indication message to a source side access device, so that the source side access device sends the access indication message to the source side access device, where the access indication message is used to instruct the UE to access the target side access device; or sending, by the centralized control node, a second notification message to a target side access device, where the second notification message is used to instruct the target side access device to send, to the UE, access information used to instruct the UE to access the target side access device.

In a first possible implementation manner of the third aspect, the access indication message includes: information used to indicate an access feature of the target side access device and information used to indicate a resource reserved by the target side access device for the UE.

With reference to the third aspect or the first possible implementation manner of the third aspect, in a second possible implementation manner of the third aspect, the access indication message is further used to: after the UE accesses the target side access device, instruct the UE to maintain a connection between the UE and the source side access device, or disconnect a connection between the UE and the source side access device.

With reference to the method according to any one of the third aspect to the second possible implementation manner of the third aspect, in a third possible implementation manner of the third aspect, the access indication message is further used to: after the UE accesses the target side access device, instruct the UE to enter a discontinuous reception DRX mode.

According to a fourth aspect, an embodiment of the present invention provides an access device, including:

a sending module, configured to send an access indication message to a piece of user equipment UE, where the access indication message is used to instruct the UE to access the target side access device; or configured to send a first notification message to a target side access device, where the first notification message is used to instruct the target side access device to send, to the UE, access information used to instruct the UE to access the target side access device; and a processing module, configured to: in a process in which the UE accesses the target side access device, maintain a connection between the UE and the source side access device, where the connection between the UE and the source side access device includes a control plane connection between the UE and the source side access device or a user plane connection between the UE and the source side access device.

In a first possible implementation manner of the fourth aspect, the access device further includes:

a receiving module, configured to: before the sending module sends the access indication message to the UE, receive the access indication message sent by a centralized control node.

With reference to the fourth aspect or the first possible implementation manner of the fourth aspect, in a second possible implementation manner of the fourth aspect, the access indication message includes: information used to indicate an access feature of the target side access device and information used to indicate a resource reserved by the target side access device for the UE.

With reference to the access device according to any one of the fourth aspect to the second possible implementation manner of the fourth aspect, in a third possible implementation manner of the fourth aspect, the access indication message is further used to: after the UE accesses the target side access device, instruct the UE to maintain the connection between the UE and the source side access device, or disconnect the connection between the UE and the source side access device.

With reference to the access device according to any one of the fourth aspect to the third possible implementation manner of the fourth aspect, in a fourth possible implementation manner of the fourth aspect, the sending module is further configured to:

send a first bearer transfer message to the UE, where the first bearer transfer message carries a bearer identifier of a bearer between the UE and the source side access device, and the bearer identifier is used to instruct the UE to transfer a bearer corresponding to the bearer identifier to the target side access device.

With reference to the access device according to any one of the fourth aspect to the third possible implementation manner of the fourth aspect, in a fifth possible implementation manner of the fourth aspect, the sending module is further configured to:

send a bearer identifier of a bearer between the UE and the source side access device to the target side access device, where the bearer identifier of the bearer between the UE and the source side access device is used to instruct the target side access device to send a second bearer transfer message to the UE, where the second bearer transfer message is used to instruct the UE to transfer a bearer corresponding to the bearer identifier to the target side access device.

With reference to the access device according to any one of the fourth aspect to the fifth possible implementation manner of the fourth aspect, in a sixth possible implementation manner of the fourth aspect, the access indication message is further used to: after the UE accesses the target side access device, instruct the UE to enter a discontinuous reception DRX mode.

According to a fifth aspect, an embodiment of the present invention provides an access device, including:

a receiving module, configured to receive an access indication message sent by a source side access device, where the access indication message is used to instruct the UE to access the target side access device; or configured to receive access information that is sent by the target side access device and used to instruct the UE to access the target side access device; and a processing module, configured to access the target side access device according to the access indication message or the access information, where in a process in which the UE accesses the target side access device, the UE maintains a connection between the UE and the source side access device, where the connection between the UE and the source side access device includes a control plane connection between the UE and the source side access device or a user plane connection between the UE and the source side access device.

In a first possible implementation manner of the fifth aspect, the processing module is further configured to:

detect the target side access device before the receiving module receives the access indication message sent by the source side access device; and the access device further includes:

a sending module, configured to report a first discovery message to the source side access device, where the first discovery message is used to indicate the target side access device detected by the UE.

With reference to the fifth aspect or the first possible implementation manner of the fifth aspect, in a second possible implementation manner of the fifth aspect, the access indication message includes: information used to indicate an access feature of the target side access device and information used to indicate a resource reserved by the target side access device for the UE.

With reference to the access device according to any one of the fifth aspect to the second possible implementation manner of the fifth aspect, in a third possible implementation manner of the fifth aspect, the access indication message is further used to: after the UE accesses the target side access device, instruct the UE to maintain the connection between the UE and the source side access device, or disconnect the connection between the UE and the source side access device.

With reference to the third possible implementation manner of the fifth aspect, in a fourth possible implementation manner of the fifth aspect, if the indication information is used to: after the UE accesses the target side access device, instruct to disconnect the connection between the UE and the source side access device, the processing module is further configured to:

after the access module accesses the target side access device, disconnect the connection between the UE and the source side access device.

With reference to the access device according to any one of the fifth aspect to the fourth possible implementation manner of the fifth aspect, in a fifth possible implementation manner of the fifth aspect, the receiving module is further configured to:

receive a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device; or configured to receive a second bearer transfer message sent by the target side access device, where the second bearer transfer message is used to instruct the UE to transfer a bearer corresponding to a bearer identifier to the target side access device.

With reference to the access device according to any one of the fifth aspect to the fourth possible implementation manner of the fifth aspect, in a sixth possible implementation manner of the fifth aspect, the sending module is further configured to:

send a traffic flow template TFT, a procedure transaction identifier PTI, and a bearer identifier of a bearer between the UE and the source side access device to the source side access device, where the TFT, the PTI, and the bearer identifier of the bearer between the UE and the source side access device are used by the source side access device to stop using a bearer that corresponds to the bearer identifier of the bearer between the UE and the source side access device to exchange data with the UE.

With reference to the access device according to any one of the fifth aspect to the sixth possible implementation manner of the fifth aspect, in a seventh possible implementation manner of the fifth aspect, the access indication message is further used to: after the UE accesses the target side access device, instruct the UE to enter a discontinuous reception DRX mode, and the processing module is further configured to:

enter the DRX mode according to the access indication message to exchange data with the source side access device, or exchange data with the target side access device.

According to a sixth aspect, an embodiment of the present invention provides a centralized control node, including:

a sending module, configured to send an access indication message to a source side access device, so that the source side access device sends the access indication message to the source side access device, where the access indication message is used to instruct the UE to access the target side access device; or configured to send a second notification message to a target side access device, where the second notification message is used to instruct the target side access device to send, to the UE, access information used to instruct the UE to access the target side access device.

In a first possible implementation manner of the sixth aspect, the access indication message includes: information used to indicate an access feature of the target side access device and information used to indicate a resource reserved by the target side access device for the UE.

With reference to the sixth aspect or the first possible implementation manner of the sixth aspect, in a second possible implementation manner of the sixth aspect, the access indication message is further used to: after the UE accesses the target side access device, instruct the UE to maintain a connection between the UE and the source side access device, or disconnect a connection between the UE and the source side access device.

With reference to the centralized control node according to any one of the sixth aspect to the second possible implementation manner of the sixth aspect, in a third possible implementation manner of the sixth aspect, the access indication message is further used to: after the UE accesses the target side access device, instruct the UE to enter a discontinuous reception DRX mode.

According to a seventh aspect, an embodiment of the present invention provides an access device, including:

a transmitter, configured to send an access indication message to a piece of user equipment UE, where the access indication message is used to instruct the UE to access the target side access device; or configured to send a first notification message to a target side access device, where the first notification message is used to instruct the target side access device to send, to the UE, access information used to instruct the UE to access the target side access device; and a processor, configured to: in a process in which the UE accesses the target side access device, maintain a connection between the UE and the source side access device, where the connection between the UE and the source side access device includes a control plane connection between the UE and the source side access device or a user plane connection between the UE and the source side access device.

In a first possible implementation manner of the seventh aspect, the access device further includes:

a receiver, configured to: before the sending module sends the access indication message to the UE, receive the access indication message sent by a centralized control node.

With reference to the seventh aspect or the first possible implementation manner of the seventh aspect, in a second possible implementation manner of the seventh aspect, the access indication message includes: information used to indicate an access feature of the target side access device and information used to indicate a resource reserved by the target side access device for the UE.

With reference to the access device according to any one of the seventh aspect to the second possible implementation manner of the seventh aspect, in a third possible implementation manner of the seventh aspect, the access indication message is further used to: after the UE accesses the target side access device, instruct the UE to maintain the connection between the UE and the source side access device, or disconnect the connection between the UE and the source side access device.

With reference to the access device according to any one of the seventh aspect to the third possible implementation manner of the seventh aspect, in a fourth possible implementation manner of the seventh aspect, the transmitter is further configured to:

send a first bearer transfer message to the UE, where the first bearer transfer message carries a bearer identifier of a bearer between the UE and the source side access device, and the bearer identifier is used to instruct the UE to transfer a bearer corresponding to the bearer identifier to the target side access device.

With reference to the access device according to any one of the seventh aspect to the third possible implementation manner of the seventh aspect, in a fifth possible implementation manner of the seventh aspect, the transmitter is further configured to:

send a bearer identifier of a bearer between the UE and the source side access device to the target side access device, where the bearer identifier of the bearer between the UE and the source side access device is used to instruct the target side access device to send a second bearer transfer message to the UE, where the second bearer transfer message is used to instruct the UE to transfer a bearer corresponding to the bearer identifier to the target side access device.

With reference to the access device according to any one of the seventh aspect to the fifth possible implementation manner of the seventh aspect, in a sixth possible implementation manner of the seventh aspect, the access indication message is further used to: after the UE accesses the target side access device, instruct the UE to enter a discontinuous reception DRX mode.

According to an eighth aspect, an embodiment of the present invention provides an access device, including:
- a receiver, configured to receive an access indication message sent by a source side access device, where the access indication message is used to instruct the UE to access the target side access device; or configured to receive access information that is sent by the target side access device and used to instruct the UE to access the target side access device; and
- a processor, configured to access the target side access device according to the access indication message or the access information, where
- in a process in which the UE accesses the target side access device, the UE maintains a connection between the UE and the source side access device, where the connection between the UE and the source side access device includes a control plane connection between the UE and the source side access device or a user plane connection between the UE and the source side access device.

In a first possible implementation manner of the eighth aspect, the processor is further configured to:
- detect the target side access device before the receiver receives the access indication message sent by the source side access device; and
- the access device further includes:
- a transmitter, configured to report a first discovery message to the source side access device, where the first discovery message is used to indicate the target side access device detected by the UE.

With reference to the eighth aspect or the first possible implementation manner of the eighth aspect, in a second possible implementation manner of the eighth aspect, the access indication message includes: information used to indicate an access feature of the target side access device and information used to indicate a resource reserved by the target side access device for the UE.

With reference to the access device according to any one of the eighth aspect to the second possible implementation manner of the eighth aspect, in a third possible implementation manner of the eighth aspect, the access indication message is further used to: after the UE accesses the target side access device, instruct the UE to maintain the connection between the UE and the source side access device, or disconnect the connection between the UE and the source side access device.

With reference to the third possible implementation manner of the eighth aspect, in a fourth possible implementation manner of the eighth aspect, if the indication information is used to: after the UE accesses the target side access device, instruct to disconnect the connection between the UE and the source side access device, the processor is further configured to:
- after the access point accesses the target side access device, disconnect the connection between the UE and the source side access device.

With reference to the access device according to any one of the eighth aspect to the fourth possible implementation manner of the eighth aspect, in a fifth possible implementation manner of the eighth aspect, the receiver is further configured to:
- receive a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device; or configured to receive a second bearer transfer message sent by the target side access device, where the second bearer transfer message is used to instruct the UE to transfer a bearer corresponding to a bearer identifier to the target side access device.

With reference to the access device according to any one of the eighth aspect to the fourth possible implementation manner of the eighth aspect, in a sixth possible implementation manner of the eighth aspect, the transmitter is further configured to:
- send a traffic flow template TFT, a procedure transaction identifier PTI, and a bearer identifier of a bearer between the UE and the source side access device to the source side access device, where the TFT, the PTI, and the bearer identifier of the bearer between the UE and the source side access device are used by the source side access device to stop using a bearer that corresponds to the bearer identifier of the bearer between the UE and the source side access device to exchange data with the UE.

With reference to the access device according to any one of the eighth aspect to the sixth possible implementation manner of the eighth aspect, in a seventh possible implementation manner of the eighth aspect, the access indication message is further used to: after the UE accesses the target side access device, instruct the UE to enter a discontinuous reception DRX mode, and the processor is further configured to:
- enter the DRX mode according to the access indication message to exchange data with the source side access device, or exchange data with the target side access device.

According to a ninth aspect, an embodiment of the present invention provides a centralized control node, including:
- a transmitter, configured to send an access indication message to a source side access device, so that the source side access device sends the access indication message to the source side access device, where the access indication message is used to instruct the UE to access the target side access device; or
- configured to send a second notification message to a target side access device, where the second notification message is used to instruct the target side access device to send, to the UE, access information used to instruct the UE to access the target side access device.

In a first possible implementation manner of the ninth aspect, the access indication message includes: information used to indicate an access feature of the target side access device and information used to indicate a resource reserved by the target side access device for the UE.

With reference to the ninth aspect or the first possible implementation manner of the ninth aspect, in a second possible implementation manner of the ninth aspect, the access indication message is further used to: after the UE accesses the target side access device, instruct the UE to maintain a connection between the UE and the source side access device, or disconnect a connection between the UE and the source side access device.

With reference to the centralized control node according to any one of the ninth aspect to the second possible implementation manner of the ninth aspect, in a third possible implementation manner of the ninth aspect, the access indication message is further used to: after the UE accesses the target side access device, instruct the UE to enter a discontinuous reception DRX mode.

According to the method for accessing a network by a piece of user equipment, and the access device that are provided in the embodiments of the present invention, a source side access device sends an access indication message to a UE, where the access indication message is used to instruct the UE to access a target side access device; or a source side access device sends a first notification message to a target side access device, where the first notification message is used to instruct the target side access device to send, to a UE, access information used to instruct the UE to access the target side access device; and in a process in which the UE accesses the target side access device, the source side access device maintains a connection between the UE and the source side access device. Therefore, in the process in which the UE accesses the target side access device, the source side access device maintains the connection between the UE and the source side access device; therefore, a service interruption is not caused.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

Figure 1:
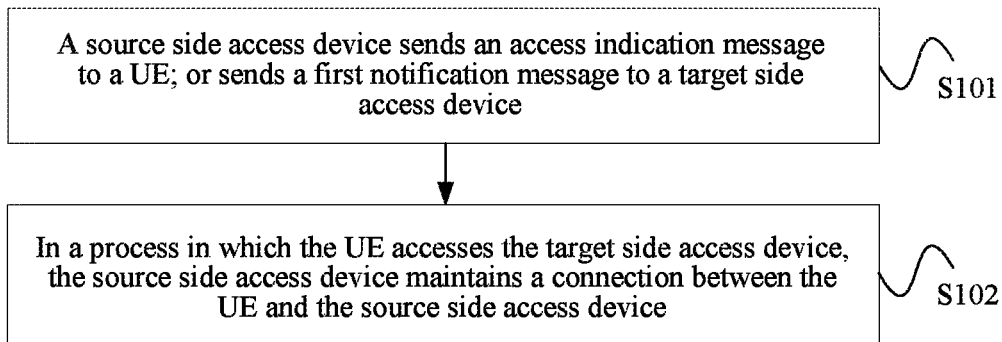
FIG. 1 is a flowchart of Embodiment 1 of a method for accessing a network by a piece of user equipment according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

Technologies described in the embodiments of the present invention may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a General Packet Radio Service (GPRS) system, a Long Term Evolution (LTE) system, and other communications systems of this type.

A piece of user equipment involved in the embodiments of the present invention may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks via a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voices and/or data with the radio access network. For example, the wireless terminal may be a device such as a personal communication service (PCS,) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point, a remote terminal, an access terminal, a user terminal, a user agent, a user device, or a piece of user equipment.

Either of a source side access network device and a target side access device involved in the embodiments of the present invention may be a device, such as a base station or a radio network controller (RNC), independently disposed in a radio access network (RAN), or may be a functional module in the foregoing devices on a radio access network side.

A base station (for example, an access point) may refer to a device in communication with a wireless terminal via one or more sectors on an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may also coordinate attribute management of the air interface. For example, the base station may be a base station (BTS) in GSM or CDMA, may be a base station (NodeB) in WCDMA, or may be an evolved NodeB (NodeB, eNB, or e-NodeB,) in LTE, which is not limited in the embodiments of the present invention.

A base station controller may be a base station controller (BSC) in GSM or CDMA, or a radio network controller (RNC) in WCDMA, which is not limited in the embodiments of the present invention.

An access network device may be a network element, such as an access point (AP) in a WLAN, or may be a base station (BTS) in a GSM network, a GPRS network, or a CDMA network, or may be a base station (NodeB) in a CDMA 2000 network or a WCDMA network, or may be an evolved NodeB (eNB) in an LTE network, or may be an access service network base station (ASN BS) in a WiMAX network; or may be a network element, such as the foregoing access point, a controller of a base station, or an authenticator.

FIG. 1 is a flowchart of Embodiment 1 of a method for accessing a network by a piece of user equipment according to the present invention. This embodiment is described by using an example in which a source side access device is used as an execution body. As shown in FIG. 1, the method of this embodiment may include the following content:

S101. A source side access device sends an access indication message to a UE, where the access indication message is used to instruct the UE to access a target side access device; or a source side access device sends a first notification message to a target side access device, where the first notification message is used to instruct the target side access device to send, to a UE, access information used to instruct the UE to access the target side access device.

S102. In a process in which the UE accesses the target side access device, the source side access device maintains a connection between the UE and the source side access device.

The connection between the UE and the source side access device includes a control plane connection between the UE and the source side access device or a user plane connection between the UE and the source side access device.

As an implementable manner, before the sending, by a source side access device, an access indication message to a UE, the method further includes: receiving, by the source side access device, the access indication message sent by a centralized control node.

Optionally, before the sending, by a source side access device, an access indication message to a UE, the method further includes:

determining, by the source side access device, that the user equipment UE is in a coverage range of the target side access device.

As an example, the source side access device currently is serving the UE, the source side access device first determines that the UE is in the coverage range of the target side access device, and there are two implementable manners used by the source side access device to perform the determining. As an optional implementation manner, before the source side access device determines that the UE is in the coverage range of the target side access device, the source side access device receives a first discovery message reported by the UE, where the first discovery message is used to indicate that the UE detects the target side access device. As another optional implementation manner, before the source side access device determines that the UE is in the coverage range of the target side access device, the source side access device receives a second discovery message reported by the target side access device, where the second discovery message is used to indicate that the target side access device detects that the UE is in the coverage range of the target side access device. For example, a source side uplink receiver may be installed on the target side access device, where the source side uplink receiver may be configured to receive an uplink signal sent by the UE to the source side access device, and the target side access device may determine, according to strength of the uplink signal, whether the UE is in the coverage range of the target side access device. When the target side access device detects, by using the uplink receiver, that the UE is in the coverage range of the target side access device, the target side access device reports the second discovery message report to the source side access device, and when receiving the second discovery message, the source side access device may determine that the UE is in the coverage range of the target side access device.

In S101, as an optional implementation manner, the source side access device sends the access indication message to the UE, where the access indication message is used to instruct the UE to access the target side access device.

Optionally, if the source side access device exchanges information with the target side access device before the access indication message is sent, the access indication message may include information about an access feature of the target side access device and information about a resource reserved by the target side access device for the UE, where the information about the access feature may include an identifier, such as a service set identifier (Service Set Identifier, SSID for short), a carrier of Wifi, or a WLAN standard, of a target side, so that after receiving the information about the access feature, the UE accesses a corresponding target side according to the identifier of the target side; and the target side access device reserves a resource for the UE, so that after accessing the target side access device, the UE does not need to wait for resource allocation.

Optionally, the access indication message is further used to: after the UE accesses the target side access device, instruct the UE to maintain the connection between the UE and the source side access device, or disconnect the connection between the UE and the source side access device. For example, indication information is represented by using an indication bit, where when the indication bit is 1, the UE is instructed to maintain, after the UE accesses the target side access device, a current connection between the UE and the source side access device, and maintain a bearer that is not transferred; or when the indication bit is 0, the UE is instructed to release a current connection, that is, disconnect a current connection between the UE and the source side access device, and release a resource, which can reduce load of the source side access device.

As another optional implementation manner, the source side access device sends a notification message to the target side access device, where the notification message is used to instruct the target side access device to initiate a connection to the UE, so that the UE maintains the connection between the UE and the source side access device and accesses the target side access device. Before the source side access device sends the notification message to the target side access device, the source side access device sends an enabling message to the UE, where the enabling message is used to instruct the UE to enable a module for communicating with the target side access device.

After S101, that is, after the source side access device determines that the UE is in the coverage range of the target side access device, at least one bearer is transferred, and there are two implementable manners:

As an optional implementation manner, the source side access device sends a first bearer transfer message to the UE, where the first bearer transfer message carries a bearer identifier of a bearer between the UE and the source side access device, and the bearer identifier is used to instruct the UE to transfer a bearer corresponding to the bearer identifier to the target side access device; as another optional implementation manner, the source side access device sends a bearer identifier of a bearer between the UE and the source side access device to the target side access device, where the bearer identifier of the bearer between the UE and the source side access device is used to instruct the target side access device to send a second bearer transfer message to the UE, where the second bearer transfer message is used to instruct the UE to transfer a bearer corresponding to the bearer identifier to the target side access device. At least one bearer is selectively transferred, which improves flexibility, and can provide better performance according to different features of a source side and a target side. It should be noted herein that the bearer transfer message for bearer transfer may be sent before or after the UE establishes a connection to a target side; and if the bearer transfer message is sent before the UE establishes a connection to the target side, the bearer transfer message and the access indication message may be jointly sent, where the bearer transfer message may be independent, or may be included in the access indication message.

Optionally, the access indication message is further used to: after the UE accesses the target side access device, instruct the UE to enter a discontinuous reception (DRX for short below) mode, where when the UE enters the DRX mode, the UE only needs to perform waking up at a moment specified by a DRX configuration, to listen to a wireless channel, and during the rest of time, the UE may disable a receiver thereof, which saves more electricity for the UE.

According to the method, provided in this embodiment, for accessing a network by a piece of user equipment, a source side access device sends an access indication message to a UE, where the access indication message is used to instruct the UE to access a target side access device, or a source side access device sends a first notification message to a target side access device, where the first notification message is used to instruct the target side access device to send, to a UE, access information used to instruct the UE to access the target side access device; and in a process in which the UE accesses the target side access device, the source side access device maintains a connection between the UE and the source side access device. Therefore, in the process in which the UE accesses the target side access device, the source side access device maintains the connection between the UE and the source side access device; therefore, a service interruption is not caused.

Figure 2:
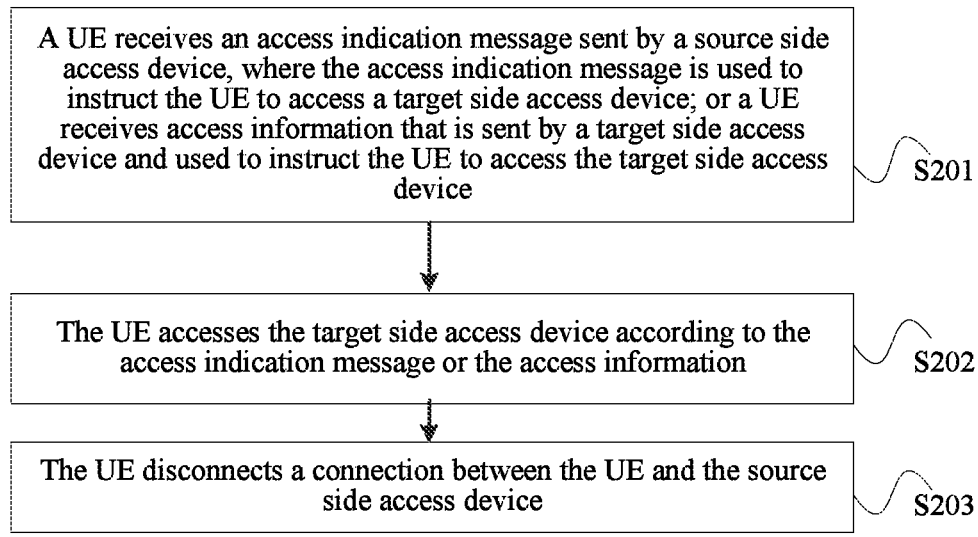
FIG. 2 is a flowchart of Embodiment 2 of a method for accessing a network by a piece of user equipment according to the present invention.

FIG. 2 is a flowchart of Embodiment 2 of a method for accessing a network by a piece of user equipment according to the present invention. This embodiment is described by using an example in which a UE is used as an execution body. As shown in FIG. 2, the method of this embodiment may include:

S201. A UE receives an access indication message sent by a source side access device, where the access indication message is used to instruct the UE to access a target side access device; or a UE receives access information that is sent by a target side access device and used to instruct the UE to access the target side access device.

S202. The UE accesses the target side access device according to the access indication message or the access information.

In a process in which the UE accesses the target side access device, the UE maintains a connection between the UE and the source side access device, where the connection between the UE and the source side access device includes a control plane connection between the UE and the source side access device or a user plane connection between the UE and the source side access device.

In S201, as an optional implementation manner, the UE receives the access indication message sent by the source side access device, where the access indication message is used to instruct the UE to access the target side access device. Before the UE receives the access indication message sent by the source side access device, when detecting the target side access device, the UE reports a first discovery message to the source side access device, where the first discovery message is used to indicate that the UE detects the target side access device.

Optionally, if the source side access device exchanges information with the target side access device before the access indication message is sent, the access indication message may include information about an access feature of the target side access device and information about a resource reserved by the target side access device for the UE, where the information about the access feature may include an identifier of a target side, so that after receiving the information about the access feature, the UE accesses a corresponding target side according to the identifier of the target side; and the target side access device reserves a resource for the UE, so that after accessing the target side access device, the UE does not need to wait for resource allocation.

As another optional implementation manner, the UE receives a connection establishment request sent by the target side access device, where before the UE receives the connection establishment request sent by the target side access device, the UE receives an enabling message sent by the source side access device, where the enabling message is used to instruct the UE to enable a module for communicating with the target side access device, and the UE enables, according to the enabling message, the module for communicating with the target side access device.

In S202, optionally, the access indication message is further used to: after the UE accesses the target side access device, instruct the UE to maintain the connection between the UE and the source side access device, or disconnect the connection between the UE and the source side access device. For example, indication information is represented by using an indication bit, where when the indication bit is 1, the UE is instructed to maintain, after the UE accesses the target side access device, a current connection between the UE and the source side access device, and maintain a bearer that is not transferred; or when the indication bit is 0, the UE is instructed to release a current connection, that is, disconnect a current connection between the UE and the source side access device, and release a resource, which can reduce load of the source side access device.

If the indication information is used to: after the UE accesses the target side access device, instruct to disconnect the connection between the UE and the source side access device, after the UE accesses the target side access device, the method further includes:

S203. The UE disconnects the connection between the UE and the source side access device.

The accessing, by the UE, the target side access device according to the access indication message or the access information further includes:

As an optional implementation manner, the UE receives a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device.

As another optional implementation manner, the UE receives a second bearer transfer message sent by the target side access device, where the second bearer transfer message is used to instruct the UE to transfer a bearer corresponding to a bearer identifier to the target side access device.

As still another optional implementation manner, the UE sends a traffic flow template (TFT for short below), a procedure transaction identifier (PTI for short below), and an identifier of a bearer on a network side (an EPS bearer Identity) to the source side access device, where the TFT, the PTI, and the bearer identifier on the network side are used by the source side access device to stop using a bearer that corresponds to the bearer identifier between the UE and the source side access device to exchange data with the UE.

A bearer is selectively transferred, which improves flexibility, and can provide better performance according to different features of a source side and a target side.

Optionally, the access indication message is further used to: after the UE accesses the target side access device, instruct the UE to enter a DRX mode, and the method further includes:

entering, by the UE, the DRX mode according to the access indication message to exchange data with the source side access device, or exchange data with the target side access device, where when the UE enters the DRX mode, the UE only needs to perform waking up at a moment specified by a DRX configuration, to listen to a wireless channel, and during the rest of time, the UE may disable a receiver thereof, which saves more electricity for the UE.

According to the method, provided in this embodiment, for accessing a network by a piece of user equipment, a UE receive an access indication message sent by a source side access device, where the access indication message is used to instruct the UE to access a target side access device, or a UE receives access information that is sent by a target side access device and used to instruct the UE access the target side access device; and then the UE accesses the target side access device according to the access indication message or the access information. In addition, in a process in which the UE accesses the target side access device, the UE maintains a connection between the UE and the source side access device. Therefore, in the process in which the UE accesses the target side access device, the UE maintains the connection between the UE and the source side access device; therefore, a service interruption is not caused.

Figure 3:
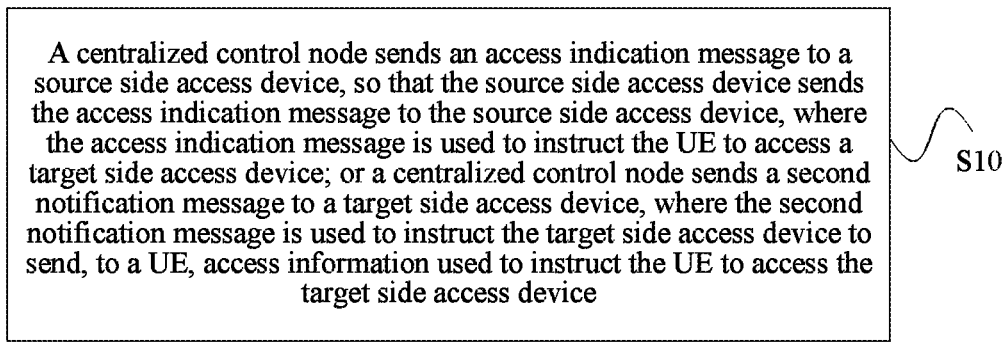
FIG. 3 is a flowchart of Embodiment 3 of a method for accessing a network by a piece of user equipment according to the present invention.

FIG. 3 is a flowchart of Embodiment 3 of a method for accessing a network by a piece of user equipment according to the present invention. As shown in FIG. 3, this embodiment is described by using an example in which a centralized control node is used as an execution body. The method of this embodiment may include:

S10. A centralized control node sends an access indication message to a source side access device, so that the source side access device sends the access indication message to the source side access device, where the access indication message is used to instruct the UE to access a target side access device; or a centralized control node sends a second notification message to a target side access device, where the second notification message is used to instruct the target side access device to send, to a UE, access information used to instruct the UE to access the target side access device.

Further, the access indication message includes: information used to indicate an access feature of the target side access device and information used to indicate a resource reserved by the target side access device for the UE.

Optionally, the access indication message is further used to: after the UE accesses the target side access device, instruct the UE to maintain a connection between the UE and the source side access device, or disconnect a connection between the UE and the source side access device.

In the foregoing embodiment, optionally, the access indication message is further used to: after the UE accesses the target side access device, instruct the UE to enter a DRX mode.

According to the method, provided in this embodiment, for accessing a network by a piece of user equipment, a centralized control node sends an access indication message to a source side access device, so that the source side access device sends the access indication message to the source side access device, where the access indication message is used to instruct the UE to access a target side access device, or a centralized control node sends a second notification message to a target side access device, where the second notification message is used to instruct the target side access device to send, to a UE, access information used to instruct the UE to access the target side access device. Therefore, in a process in which the UE accesses the target side access device, the source side access device maintains a connection between the UE and the source side access device; therefore, a service interruption is not caused.

Figure 4:
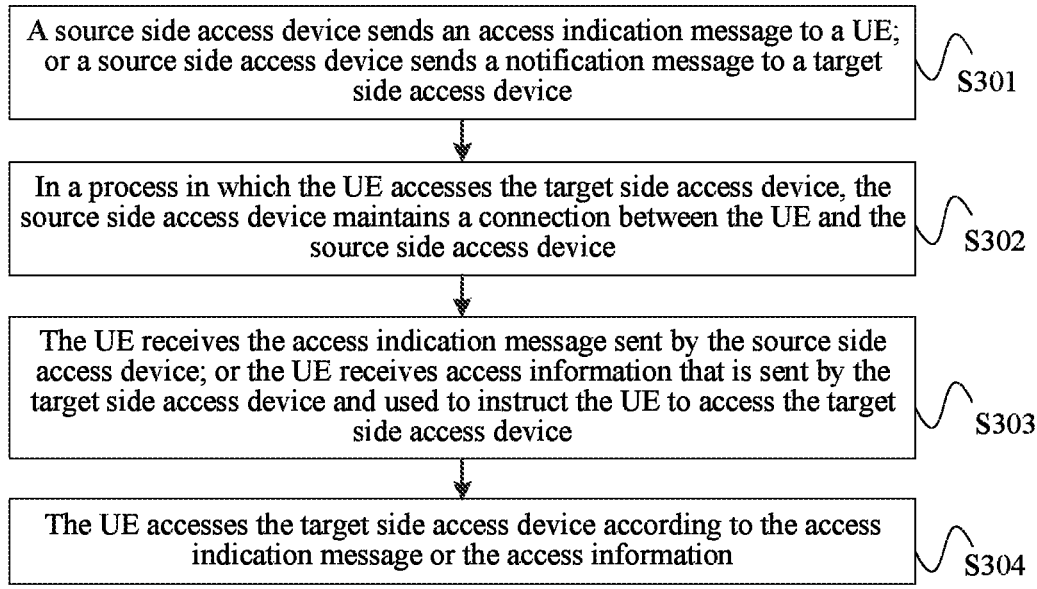
FIG. 4 is a flowchart of Embodiment 4 of a method for accessing a network by a piece of user equipment according to the present invention.

FIG. 4 is a flowchart of Embodiment 4 of a method for accessing a network by a piece of user equipment according to the present invention. As shown in FIG. 4, this embodiment is described by using an example in which after determining that a UE is in a coverage range of a target side access device, a source side access device instructs the UE to access the target side access device or instructs the target side access device to initiate a connection to the UE. The method of this embodiment may include:

S301. A source side access device sends an access indication message to a UE, where the access indication message is used to instruct the UE to access a target side access device; or a source side access device sends a notification message to a target side access device, where the notification message is used to instruct the target side access device to send, to a UE, access information used to instruct the UE to access the target side access device.

S302. In a process in which the UE accesses the target side access device, the source side access device maintains a connection between the UE and the source side access device.

The connection between the UE and the source side access device includes a control plane connection between the UE and the source side access device or a user plane connection between the UE and the source side access device.

As an implementable manner, before the sending, by a source side access device, an access indication message to a UE, the method further includes: receiving, by the source side access device, the access indication message sent by a centralized control node.

Optionally, before the sending, by a source side access device, an access indication message to a UE, the method further includes:

determining, by the source side access device, that the user equipment UE is in a coverage range of the target side access device.

In S301, as an optional implementation manner, the source side access device sends the access indication message to the UE, where the access indication message is used to instruct the UE to access the target side access device.

Optionally, if the source side access device exchanges information with the target side access device before the access indication message is sent, the access indication message may include information about an access feature of the target side access device and information about a resource reserved by the target side access device for the UE, where the information about the access feature may include an identifier, such as an SSID, a carrier of Wifi, or a WLAN standard, of a target side, so that after receiving the information about the access feature, the UE accesses a corresponding target side according to the identifier of the target side; and the target side access device reserves a resource for the UE, so that after accessing the target side access device, the UE does not need to wait for resource allocation.

Optionally, the access indication message is further used to: after the UE accesses the target side access device, instruct the UE to maintain the connection between the UE and the source side access device, or disconnect the connection between the UE and the source side access device. For example, indication information is represented by using an indication bit, where when the indication bit is 1, the UE is instructed to maintain, after the UE accesses the target side access device, a current connection between the UE and the source side access device, and maintain a bearer that is not transferred; or when the indication bit is 0, the UE is instructed to release a current connection, that is, disconnect a current connection between the UE and the source side access device, and release a resource, which can reduce load of the source side access device.

As another optional implementation manner, the source side access device sends a notification message to the target side access device, where the notification message is used to instruct the target side access device to initiate a connection to the UE, so that the UE maintains the connection between the UE and the source side access device and accesses the target side access device. Before the source side access device sends the notification message to the target side access device, the source side access device sends an enabling message to the UE, where the enabling message is used to instruct the UE to enable a module for communicating with the target side access device.

S303. The UE receives the access indication message sent by the source side access device, where the access indication message is used to instruct the UE to access the target side access device; or the UE receives the access information that is sent by the target side access device and used to instruct the UE to access the target side access device.

In a process in which the UE accesses the target side access device, the UE maintains the connection between the UE and the source side access device, where the connection between the UE and the source side access device includes a control plane connection between the UE and the source side access device or a user plane connection between the UE and the source side access device.

S304. The UE accesses the target side access device according to the access indication message or the access information.

Optionally, the access indication message may include indication information, where the indication information is used to: after the UE accesses the target side access device, instruct the UE to maintain the connection between the UE and the source side access device or disconnect the connection between the UE and the source side access device. If the indication information is used to: after the UE accesses the target side access device, instruct to disconnect the connection between the UE and the source side access device, after the UE accesses the target side access device, the connection between the UE and the source side access device is disconnected.

After S304, the method further includes: transferring, by the UE, at least one bearer between the UE and the source side access device to the target side access device.

There are three implementable manners for transferring at least one bearer.

As an optional implementation manner, the UE receives a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device.

As another optional implementation manner, the UE receives a second bearer transfer message sent by the target side access device, where the second bearer transfer message is used to instruct the UE to transfer a bearer corresponding to a bearer identifier to the target side access device.

As still another optional implementation manner, the UE sends a TFT, a PTI, and an identifier of a bearer on a network side to the source side access device, where the TFT, the PTI, and the bearer identifier on the network side are used by the source side access device to stop using a bearer that corresponds to the bearer identifier between the UE and the source side access device to exchange data with the UE, so that the source side access device stops using the bearer between the UE and the source side access device to send data to the UE.

At least one bearer is selectively transferred, which improves flexibility, and can provide better performance according to different features of a source side and a target side.

Optionally, the indication message further includes information for instructing the UE to enter a DRX mode. When the UE enters the DRX mode after receiving the information, the UE only needs to perform waking up at a moment specified by a DRX configuration, to listen to a wireless channel, and during the rest of time, the UE may disable a receiver thereof, which saves more electricity for the UE.

According to the method, provided in this embodiment, for accessing a network by a piece of user equipment, a source side access device sends an access indication message to a UE, where the access indication message is used to instruct the UE to access a target side access device, or a source side access device sends a first notification message to a target side access device, where the first notification message is used to instruct the target side access device to send, to a UE, access information used to instruct the UE to access the target side access device; the UE receives the access indication message sent by the source side access device, or the UE receives the access information that is sent by the target side access device and used to instruct the UE to access the target side access device; and then the UE accesses the target side access device according to the access indication message or the access information. In addition, in a process in which the UE accesses the target side access device, the UE maintains a connection between the UE and the source side access device. Therefore, in the process of accessing the target side access device by the UE, the UE maintains the connection between the UE and the source side access device; therefore, a service interruption is not caused.

The technical solutions of the method embodiments shown above are described in detail by using several specific embodiments below.

Figure 5:
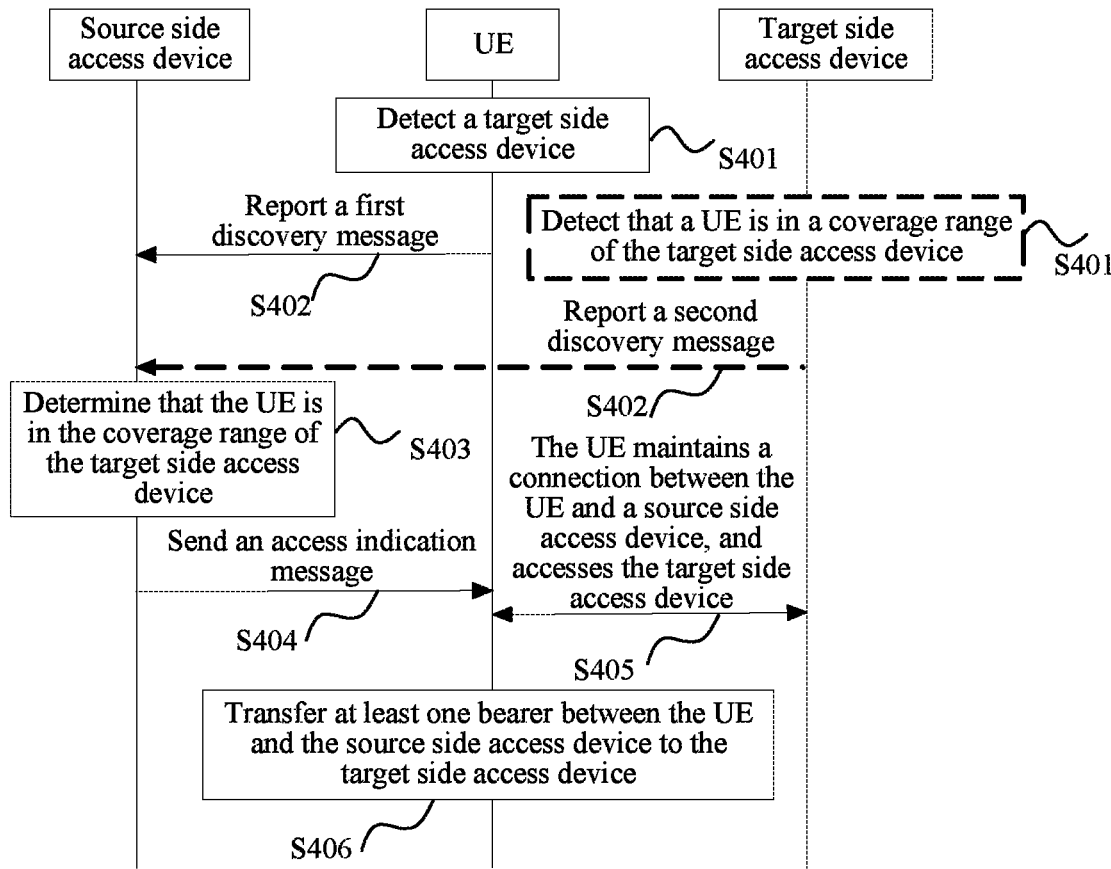
FIG. 5 is a signaling flowchart of Embodiment 1 of a method for accessing a network by a piece of user equipment according to the present invention.

FIG. 5 is a signaling flowchart of Embodiment 1 of a method for accessing a network by a piece of user equipment according to the present invention. In this embodiment, for example, a source side access device may be an LTE network, and a target side access device may be WIFI. This embodiment is described by using an example in which after determining that a UE is in a coverage range of the target side access device, the source side access device instructs the UE to access the target side access device. As shown in FIG. 5, the method of this embodiment includes:

S401. A UE detects a target side access device.

S402. The UE reports a first discovery message to a source side access device.

Optionally, the target side access device may further be used to detect whether the UE is in a coverage range of the target side access device. For example, a source side uplink receiver may be installed on the target side access device, and when the target side access device detects, by using the uplink receiver, that the UE is in the coverage range of the target side access device, the target side access device reports, to the source side access device, a second discovery message indicating that the UE is discovered; and when receiving the second discovery message, the source side access device can determine that the UE is in the coverage range of the target side access device. In this case, S401 is: A target side access device detects that a UE is in a coverage range of the target side access device; and S402 is: The UE reports a second discovery message to a source side access device.

S403. After receiving the first discovery message or the second discovery message, the source side access device determines that the UE is in the coverage range of the target side access device.

S404. The source side access device sends an access indication message to the UE.

If the source side access device exchanges information with the target side access device before the access indication message is sent, the access indication message may include information about an access feature of the target side access device and information about a resource reserved by the target side access device for the UE, where the information about the access feature may include an identifier of a target side, so that after receiving the information about the access feature, the UE accesses a corresponding target side according to the identifier of the target side; and the target side access device reserves a resource for the UE, so that after accessing the target side access device, the UE does not need to wait for resource allocation.

S405. The UE maintains a connection between the UE and the source side access device, and accesses the target side access device.

Optionally, the access indication message may include indication information, where the indication information is used to: after the UE accesses the target side access device, instruct the UE to maintain the connection between the UE and the source side access device or disconnect the connection between the UE and the source side access device. If the indication information is used to: after the UE accesses the target side access device, instruct to disconnect the connection between the UE and the source side access device, in S405, after the UE accesses the target side access device, the connection between the UE and the source side access device is disconnected.

S406. The UE transfers at least one bearer between the UE and the source side access device to the target side access device.

There are three implementable manners for transferring at least one bearer.

In a first manner, S406 includes the following steps:

S406a. The source side access device sends a bearer transfer message to the UE, where the bearer transfer message carries a bearer identifier.

S406b. After receiving the bearer transfer message sent by the source side access device, the UE transfers a bearer corresponding to the bearer identifier to the target side access device.

In a second manner, S406 includes the following steps:

S406c. The source side access device sends bearer information to the target side access device, where the bearer information carries a bearer identifier of a bearer between the UE and the source side access device.

S406d. The target side access device sends a bearer transfer message to the UE, where the bearer transfer message includes an identifier of a bearer that needs to be transferred or an identifier of a bearer on a network side that needs to be transferred.

S406e. After receiving the bearer transfer message sent by the target side access device, the UE transfers a bearer corresponding to the bearer identifier to the target side access device. It should be noted herein that the bearer transfer message for bearer transfer may be sent before or after the UE establishes a connection to a target side; and if the bearer transfer message is sent before the UE establishes a connection to the target side, the bearer transfer message and the access indication message may be jointly sent, where the bearer transfer message may be independent, or may be included in the access indication message.

In a third manner, S406 includes the following steps:

S406f. The UE sends a TFT, a PTI, and an identifier of a bearer on a network side to the source side access device.

S406g. The source side access device stops using at least one bearer between the UE and the source side access device to send data to the UE.

It should be noted herein that optionally, when the indication message further includes information for instructing the UE to enter a DRX mode, the method may further include the following step:

after receiving the information for instructing the UE to enter a DRX mode, entering, by the UE, the DRX mode.

Figure 6:
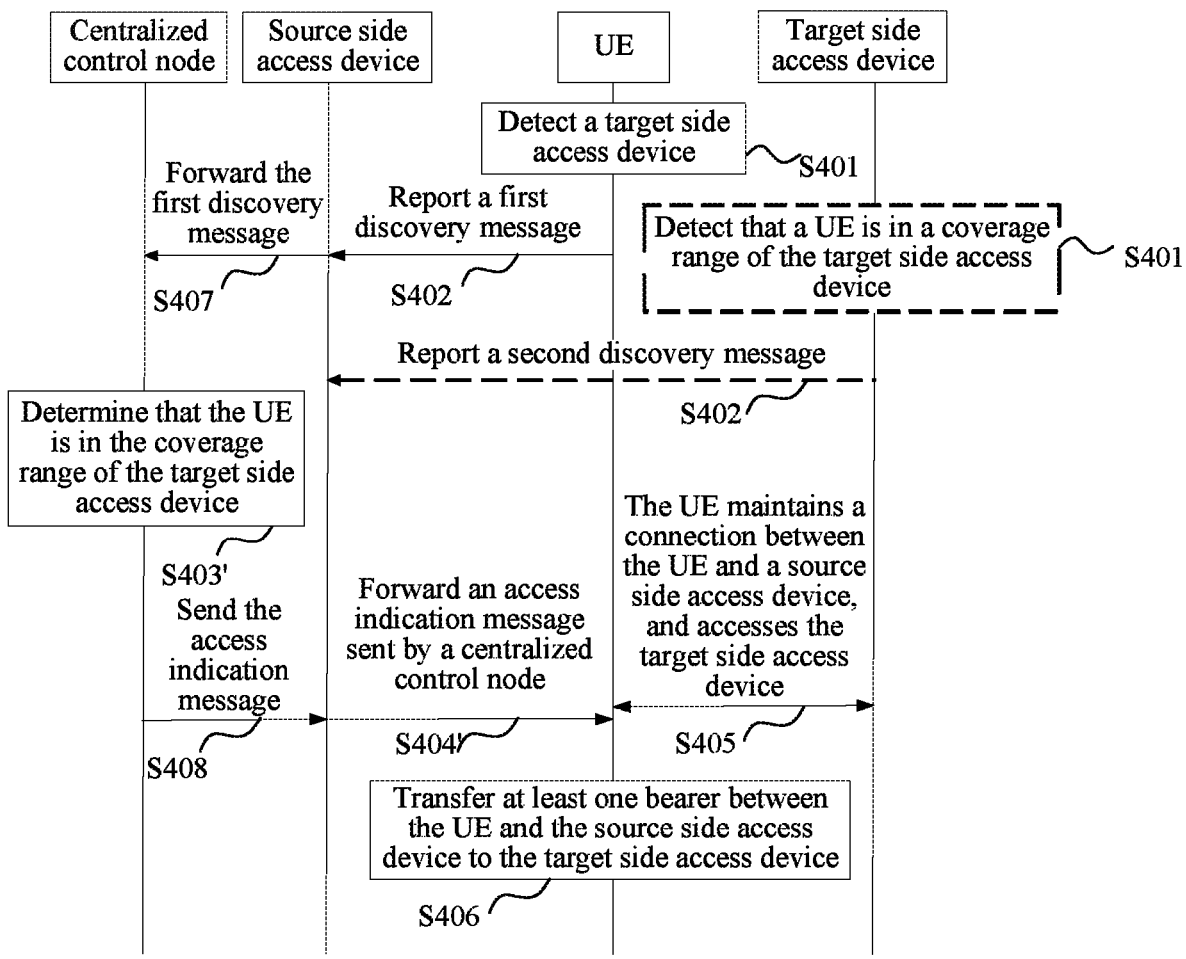
FIG. 6 is a signaling flowchart of Embodiment 2 of a method for accessing a network by a piece of user equipment according to the present invention.

FIG. 6 is a signaling flowchart of Embodiment 2 of a method for accessing a network by a piece of user equipment according to the present invention. As shown in FIG. 6, a difference between this embodiment and the embodiment shown in FIG. 5 lies only in: after step S402, the method further includes:

S407. The source side access device forwards the received first discovery message to a centralized control node.

Correspondingly, S403 is:

S403'. After receiving the first discovery message or the second discovery message, the centralized control node determines that the UE is in the coverage range of the target side access device.

Correspondingly, S404 is:

S404'. The source side access device forwards, to the UE, an access indication message sent by the centralized control node.

Before step S404', the method further includes:

S408. The centralized control node sends the access indication message to the source side access device, so that the source side access device forwards the access indication message to the UE after receiving the access indication message.

Other steps are the same, and are not described herein again.

Figure 7:
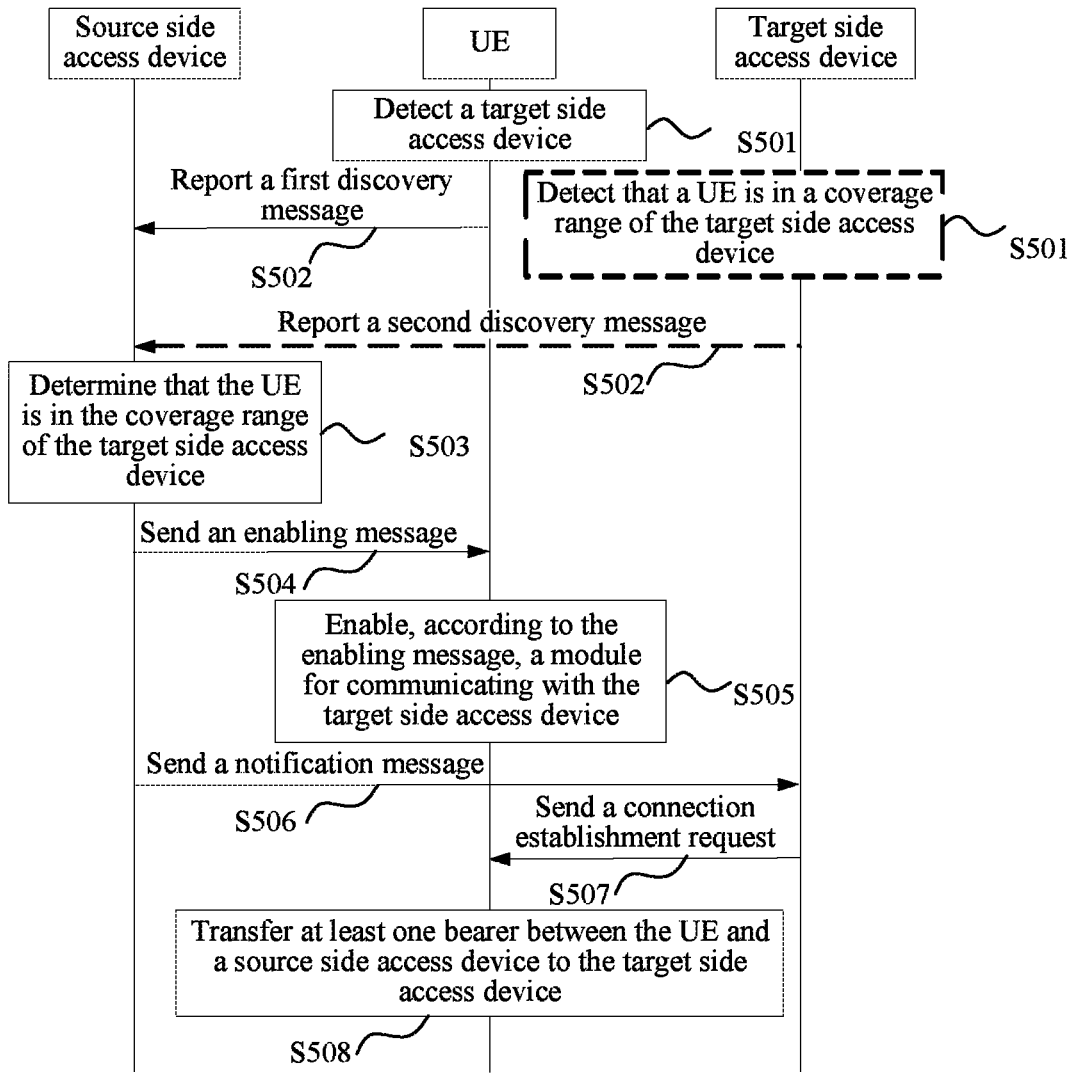
FIG. 7 is a signaling flowchart of Embodiment 3 of a method for accessing a network by a piece of user equipment according to the present invention.

FIG. 7 is a signaling flowchart of Embodiment 3 of a method for accessing a network by a piece of user equipment according to the present invention. In this embodiment, for example, a source side access device may be an LTE network, and a target side access device may be WIFI. A difference between this embodiment and the embodiments shown in FIG. 5 and FIG. 6 lies in that after determining that a UE is in a coverage range of the target side access device, the source side access device does not send an access indication message to the UE, but instructs the target side access device to initiate a connection to the UE. As shown in FIG. 7, step S501 to step S503 are the same as S401 to S403, respectively, in the embodiments shown in FIG. 5 and FIG. 6, and are not described herein again. After step S503, the method of this embodiment includes:

S504. The source side access device sends an enabling message to the UE.

S505. After receiving the enabling message, the UE enables a module for communicating with the target side access device.

S506. The source side access device sends a notification message to the target side access device.

S507. After receiving the notification message, the target side access device sends a connection establishment request to the UE, to establish a connection.

S508. The UE transfers at least one bearer between the UE and the source side access device to the target side access device.

There are three implementable manners for transferring at least one bearer.

In a first manner, S508 includes the following steps:

S508a. The source side access device sends a bearer transfer message to the UE, where the bearer transfer message carries a bearer identifier.

S508b. After receiving the bearer transfer message sent by the source side access device, the UE transfers a bearer corresponding to the bearer identifier to the target side access device.

In a second manner, S508 includes the following steps:

S508c. The source side access device sends bearer information to the target side access device, where the bearer information carries a bearer identifier of a bearer between the UE and the source side access device.

S508d. The target side access device sends a bearer transfer message to the UE, where the bearer transfer message includes an identifier of a bearer that needs to be transferred or an identifier of a bearer on a network side that needs to be transferred.

S508e. After the UE receives the bearer transfer message sent by the target side access device, steps in the following third manner are performed to transfer a bearer corresponding to the bearer identifier to the target side access device. It should be noted herein that the bearer transfer message for bearer transfer may be sent before or after the UE establishes a connection to a target side; and if the bearer transfer message is sent before the UE establishes a connection to the target side, the bearer transfer message and the enabling message may be jointly sent, where the bearer transfer message may be independent, or may be included in the enabling message.

In a third manner, S508 includes the following steps:

S508f. The UE sends a TFT, a PTI, and an identifier of a bearer on a network side to the source side access device.

S508g. The source side access device stops using at least one bearer between the UE and the source side access device to send data to the UE.

It should be noted herein that optionally, when the indication message further includes information for instructing the UE to enter a discontinuous reception DRX mode, the method may further include the following step:

S509. After receiving the information for instructing the UE to enter a DRX mode, the UE enters the DRX mode.

Optionally, the method may further include the following step:

The source side access device sends indication information to the UE, where the indication information is used to: after the UE accesses the target side access device, instruct the UE to maintain a connection between the UE and the source side access device or disconnect a connection between the UE and the source side access device. If the indication information is used to: after the UE accesses the target side access device, instruct to disconnect the connection between the UE and the source side access device, after the UE accesses the target side access device, the connection between the UE and the source side access device is disconnected.

Figure 8:
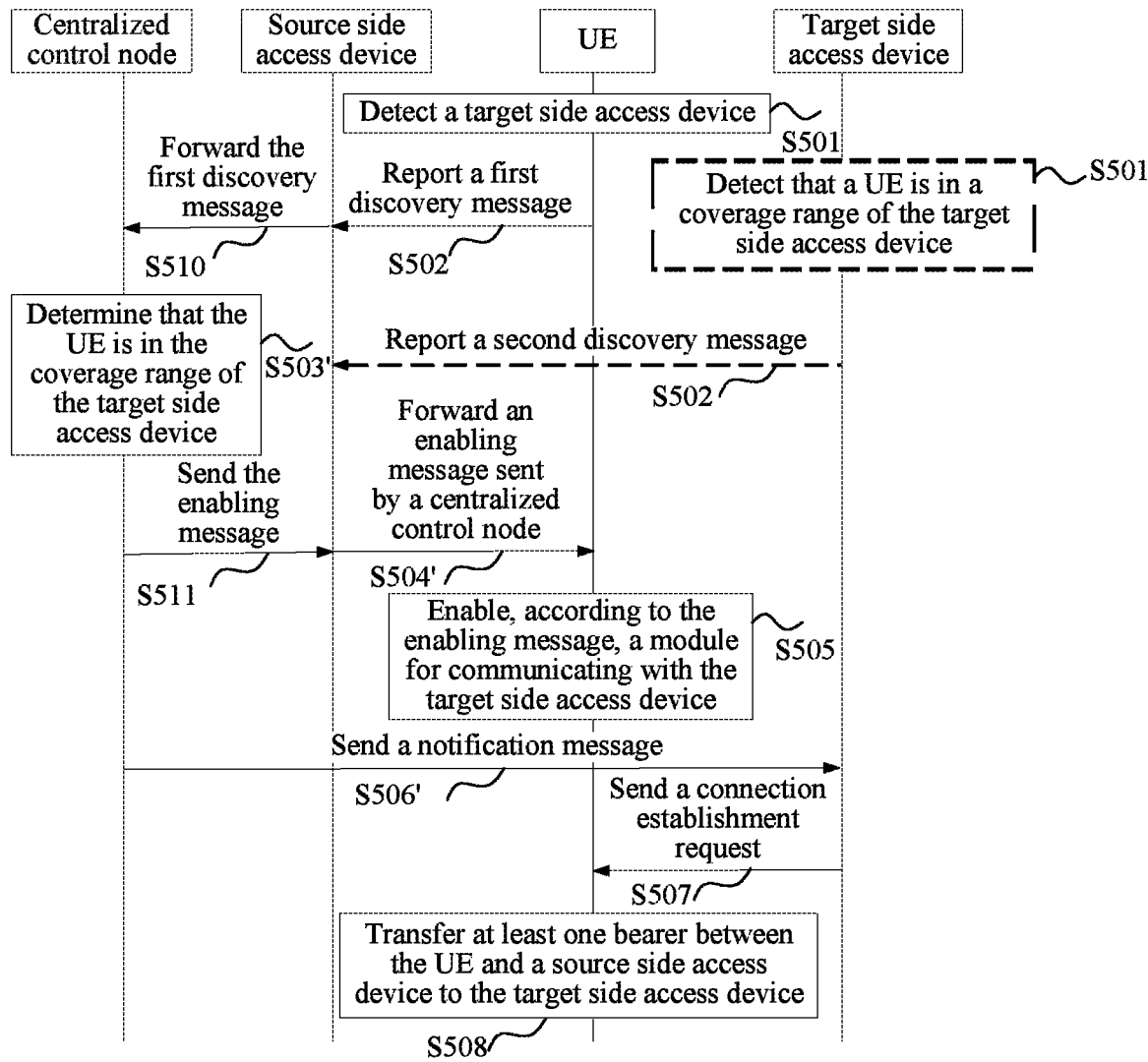
FIG. 8 is a signaling flowchart of Embodiment 4 of a method for accessing a network by a piece of user equipment according to the present invention.

FIG. 8 is a signaling flowchart of Embodiment 4 of a method for accessing a network by a piece of user equipment according to the present invention. As shown in FIG. 8, a difference between this embodiment and the embodiment shown in FIG. 7 lies only in: after S502, the method further includes:

S510. The source side access device forwards the received first discovery message to a centralized control node.

Correspondingly, S503 is:

S503'. After receiving the first discovery message or the second discovery message, the centralized control node determines that the UE is in a coverage range of the target side access device.

Correspondingly, S504 is:

S504'. The source side access device forwards, to the UE, an enabling message sent by the centralized control node.

Before S504', the method further includes:

S511. The centralized control node sends the enabling message to the source side access device, so that the source side access device forwards the enabling message to the UE after receiving the enabling message.

S506 is changed into:

S506'. The centralized control node sends a notification message to the target side access device.

Other steps are the same, and are not described herein again.

Persons of ordinary skill in the art may understand that all or some of the steps of the foregoing method embodiments may be implemented by a program instructing relevant hardware. The aforementioned program may be stored in a computer readable storage medium. When the program is executed, steps including the steps of the foregoing method embodiments are performed. The aforementioned storage medium includes: any medium that can store program code, such as a ROM, a RAM, a magnetic disk, or an optical disc.

Figure 9:
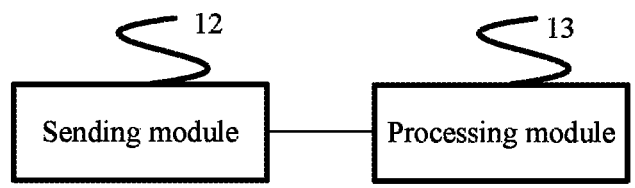
FIG. 9 is a schematic structural diagram of Embodiment 1 of an access device according to the present invention.

FIG. 9 is a schematic structural diagram of Embodiment 1 of an access device according to the present invention. As shown in FIG. 9, the access device of this embodiment may include a sending module 12 and a processing module 13, where the sending module 12 is configured to send an access indication message to a piece of user equipment UE, where the access indication message is used to instruct the UE to access a target side access device; or configured to send a first notification message to a target side access device, where the first notification message is used to instruct the target side access device to send, to a UE, access information used to instruct the UE to access the target side access device; and the processing module 13 is configured to: in a process in which the UE accesses the target side access device, maintain a connection between the UE and the source side access device, where the connection between the UE and the source side access device includes a control plane connection between the UE and the source side access device or a user plane connection between the UE and the source side access device.

The access device of this embodiment may be configured to perform the technical solution of the method embodiment shown in FIG. 1, and an implementation principle thereof is similar, which is not described herein again.

According to the access device provided in this embodiment, a sending module sends an access indication message to a UE or sends a first notification message to a target side access device; and in a process in which the UE accesses the target side access device, a processing module maintains a connection between the UE and a source side access device. Therefore, in the process in which the UE accesses the target side access device, the UE maintains the connection between the UE and the source side access device; therefore, a service interruption is not caused.

Figure 10:
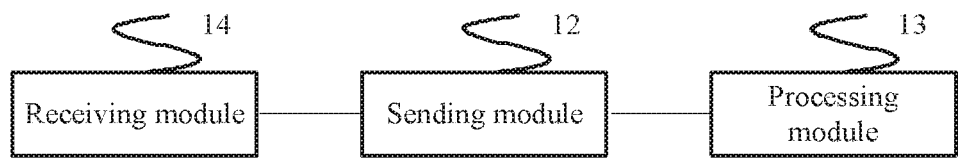
FIG. 10 is a schematic structural diagram of Embodiment 2 of an access device according to the present invention.

FIG. 10 is a schematic structural diagram of Embodiment 2 of an access device according to the present invention. Based on the access device shown in FIG. 9, as shown in FIG. 10, the access device of this embodiment may further include: a receiving module 14, where the receiving module 14 is configured to: before the sending module 12 sends the access indication message to the UE, receive the access indication message sent by a centralized control node.

Further, the access indication message includes: information used to indicate an access feature of the target side access device and information used to indicate a resource reserved by the target side access device for the UE.

Optionally, the access indication message is further used to: after the UE accesses the target side access device, instruct the UE to maintain the connection between the UE and the source side access device, or disconnect the connection between the UE and the source side access device.

In the foregoing embodiment, the sending module 12 is further configured to:

send a first bearer transfer message to the UE, where the first bearer transfer message carries a bearer identifier of a bearer between the UE and the source side access device, and the bearer identifier is used to instruct the UE to transfer a bearer corresponding to the bearer identifier to the target side access device.

In the foregoing embodiment, the sending module 12 is further configured to:

send a bearer identifier of a bearer between the UE and the source side access device to the target side access device, where the bearer identifier of the bearer between the UE and the source side access device is used to instruct the target side access device to send a second bearer transfer message to the UE, where the second bearer transfer message is used to instruct the UE to transfer a bearer corresponding to the bearer identifier to the target side access device.

In the foregoing embodiment, the access indication message is further used to: after the UE accesses the target side access device, instruct the UE to enter a discontinuous reception DRX mode.

The access device of this embodiment may be configured to perform the technical solution of the method embodiment shown in FIG. 1, and an implementation principle thereof is similar, which is not described herein again.

According to the access device provided in this embodiment, a receiving module receives an access indication message sent by a centralized control node; a sending module sends an access indication message to a UE or sends a first notification message to a target side access device; and in a process in which the UE accesses the target side access device, a processing module maintains a connection between the UE and a source side access device. Therefore, in the process in which the UE accesses the target side access device, the UE maintains the connection between the UE and the source side access device; therefore, a service interruption is not caused.

Figure 11:
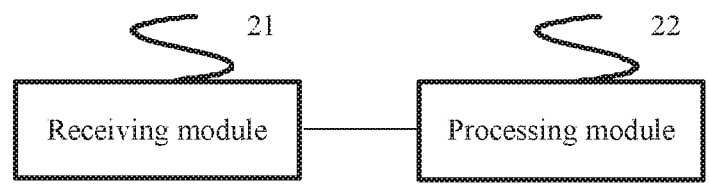
FIG. 11 is a schematic structural diagram of Embodiment 3 of an access device according to the present invention.

FIG. 11 is a schematic structural diagram of Embodiment 3 of an access device according to the present invention. As shown in FIG. 11, the access device of this embodiment may include a receiving module 21 and a processing module 22, where the receiving module 21 is configured to receive an access indication message sent by a source side access device, where the access indication message is used to instruct a UE to access a target side access device; or configured to receive access information that is sent by a target side access device and used to instruct a UE to access the target side access device; and the processing module 22 is configured to access the target side access device according to the access indication message or the access information, where in a process in which the UE accesses the target side access device, the UE maintains a connection between the UE and the source side access device, where the connection between the UE and the source side access device includes a control plane connection between the UE and the source side access device or a user plane connection between the UE and the source side access device.

The access device of this embodiment may be configured to perform the technical solution of the method embodiment shown in FIG. 2, and an implementation principle thereof is similar, which is not described herein again.

According to the access device provided in this embodiment, a receiving module receives an access indication message sent by a source side access device or receives access information that is sent by a target side access device and used to instruct a UE to access the target side access device; and a processing module accesses the target side access device according to the access indication message or the access information. Therefore, in a process in which the UE accesses the target side access device, the UE maintains a connection between the UE and the source side access device; therefore, a service interruption is not caused.

Figure 12:
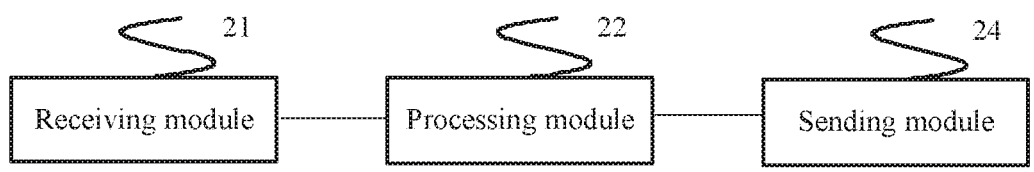
FIG. 12 is a schematic structural diagram of Embodiment 4 of an access device according to the present invention.

FIG. 12 is a schematic structural diagram of Embodiment 4 of an access device according to the present invention. As shown in FIG. 12, based on the structure of the access device shown in FIG. 11, the access device of this embodiment further includes a sending module 24, where the sending module 24 is configured to report a first discovery message to the source side access device, where the first discovery message is used to indicate the target side access device detected by the UE; and the processing module 22 is further configured to detect the target side access device before the receiving module 21 receives the access indication message sent by the source side access device.

In the foregoing embodiment, optionally, the access indication message includes: information used to indicate an access feature of the target side access device and information used to indicate a resource reserved by the target side access device for the UE.

In the foregoing embodiment, optionally, the access indication message is further used to: after the UE accesses the target side access device, instruct the UE to maintain the connection between the UE and the source side access device, or disconnect the connection between the UE and the source side access device.

Further, if indication information is used to: after the UE accesses the target side access device, instruct to disconnect the connection between the UE and the source side access device, the processing module 22 is further configured to: after the access module accesses the target side access device, disconnect the connection between the UE and the source side access device.

In the foregoing embodiment, optionally, the receiving module 21 is further configured to:

receive a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device; or configured to receive a second bearer transfer message sent by the target side access device, where the second bearer transfer message is used to instruct the UE to transfer a bearer corresponding to a bearer identifier to the target side access device.

In the foregoing embodiment, the sending module 24 is further configured to:

send a TFT, a PTI, and a bearer identifier of a bearer between the UE and the source side access device to the source side access device, where the TFT, the PTI, and the bearer identifier of the bearer between the UE and the source side access device are used by the source side access device to stop using a bearer that corresponds to the bearer identifier of the bearer between the UE and the source side access device to exchange data with the UE.

In the foregoing embodiment, the access indication message is further used to: after the UE accesses the target side access device, instruct the UE to enter a DRX mode, and the processing module 22 is further configured to:

enter the DRX mode according to the access indication message to exchange data with the source side access device, or exchange data with the target side access device.

The access device of this embodiment may be configured to perform the technical solution of the method embodiment shown in FIG. 2, and an implementation principle thereof is similar, which is not described herein again.

In Embodiment 1 of a centralized control node in the present invention, an access device of this embodiment may include: a sending module 30, where the sending module 30 is configured to send an access indication message to a source side access device, so that the source side access device sends the access indication message to the source side access device, where the access indication message is used to instruct the UE to access a target side access device; or configured to send a second notification message to a target side access device, where the second notification message is used to instruct the target side access device to send, to a UE, access information used to instruct the UE to access the target side access device.

Further, the access indication message includes: information used to indicate an access feature of the target side access device and information used to indicate a resource reserved by the target side access device for the UE.

Further, the access indication message is further used to: after the UE accesses the target side access device, instruct the UE to maintain a connection between the UE and the source side access device, or disconnect a connection between the UE and the source side access device.

In the foregoing embodiment, the access indication message is further used to: after the UE accesses the target side access device, instruct the UE to enter a DRX mode.

According to the centralized control node provided in this embodiment, a sending module sends an access indication message to a source side access device, so that the source side access device sends the access indication message to the source side access device, where the access indication message is used to instruct the UE to access a target side access device, or the centralized control node sends a second notification message to a target side access device, where the second notification message is used to instruct the target side access device to send, to a UE, access information used to instruct the UE to access the target side access device. Therefore, in a process in which the UE accesses the target side access device, the source side access device maintains a connection between the UE and the source side access device; therefore, a service interruption is not caused.

Figure 13:
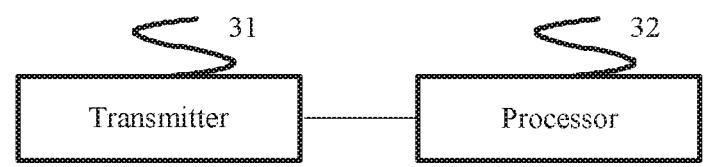
FIG. 13 is a schematic structural diagram of Embodiment 5 of an access device according to the present invention.

FIG. 13 is a schematic structural diagram of Embodiment 5 of an access device according to the present invention. As shown in FIG. 13, the access device of this embodiment may include a transmitter 31 and a processor 32, where the transmitter 31 is configured to send an access indication message to a piece of user equipment UE, where the access indication message is used to instruct the UE to access a target side access device; or configured to send a first notification message to a target side access device, where the first notification message is used to instruct the target side access device to send, to a UE, access information used to instruct the UE to access the target side access device; and the processor 32 is configured to: in a process in which the UE accesses the target side access device, maintain a connection between the UE and the source side access device, where the connection between the UE and the source side access device includes a control plane connection between the UE and the source side access device or a user plane connection between the UE and the source side access device.

The access device of this embodiment may be configured to perform the technical solution of the method embodiment shown in FIG. 1, and an implementation principle thereof is similar, which is not described herein again.

According to the access device provided in this embodiment, a transmitter sends an access indication message to a UE or sends a first notification message to a target side access device; and in a process in which the UE accesses the target side access device, a processor maintains a connection between the UE and a source side access device. Therefore, in the process in which the UE accesses the target side access device, the UE maintains the connection between the UE and the source side access device; therefore, a service interruption is not caused.

Figure 14:
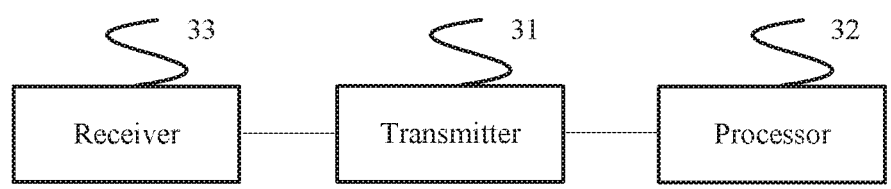
FIG. 14 is a schematic structural diagram of Embodiment 6 of an access device according to the present invention.

FIG. 14 is a schematic structural diagram of Embodiment 6 of an access device according to the present invention. Based on the access device shown in FIG. 13, as shown in FIG. 14, the access device of this embodiment may further include: a receiver 33, where the receiver 33 is configured to: before the sending module sends the access indication message to the UE, receive the access indication message sent by a centralized control node.

Further, the access indication message includes: information used to indicate an access feature of the target side access device and information used to indicate a resource reserved by the target side access device for the UE.

Optionally, the access indication message is further used to: after the UE accesses the target side access device, instruct the UE to maintain the connection between the UE and the source side access device, or disconnect the connection between the UE and the source side access device.

In the foregoing embodiment, the transmitter 31 is further configured to:

send a first bearer transfer message to the UE, where the first bearer transfer message carries a bearer identifier of a bearer between the UE and the source side access device, and the bearer identifier is used to instruct the UE to transfer a bearer corresponding to the bearer identifier to the target side access device.

In the foregoing embodiment, the transmitter 31 is further configured to:

send a bearer identifier of a bearer between the UE and the source side access device to the target side access device, where the bearer identifier of the bearer between the UE and the source side access device is used to instruct the target side access device to send a second bearer transfer message to the UE, where the second bearer transfer message is used to instruct the UE to transfer a bearer corresponding to the bearer identifier to the target side access device.

In the foregoing embodiment, the access indication message is further used to: after the UE accesses the target side access device, instruct the UE to enter a DRX mode.

The access device of this embodiment may be configured to perform the technical solution of the method embodiment shown in FIG. 1, and an implementation principle thereof is similar, which is not described herein again.

Figure 15:
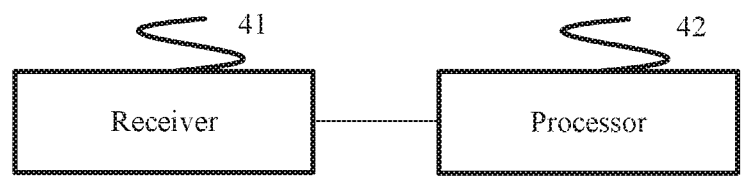
FIG. 15 is a schematic structural diagram of Embodiment 7 of an access device according to the present invention.

FIG. 15 is a schematic structural diagram of Embodiment 7 of an access device according to the present invention. As shown in FIG. 15, the access device of this embodiment may include a receiver 41 and a processor 42, where the receiver 41 is configured to receive an access indication message sent by a source side access device, where the access indication message is used to instruct a UE to access a target side access device; or configured to receive access information that is sent by a target side access device and used to instruct a UE to access the target side access device; and the processor 42 is configured to access the target side access device according to the access indication message or the access information, where in a process in which the UE accesses the target side access device, the UE maintains a connection between the UE and the source side access device, where the connection between the UE and the source side access device includes a control plane connection between the UE and the source side access device or a user plane connection between the UE and the source side access device.

The access device of this embodiment may be configured to perform the technical solution of the method embodiment shown in FIG. 2, and an implementation principle thereof is similar, which is not described herein again.

According to the access device provided in this embodiment, a receiver receives an access indication message sent by a source side access device or receives access information that is sent by a target side access device and used to instruct a UE to access the target side access device; and a processor accesses the target side access device according to the access indication message or the access information. Therefore, in a process in which the UE accesses the target side access device, the UE maintains a connection between the UE and the source side access device; therefore, a service interruption is not caused.

Figure 16:
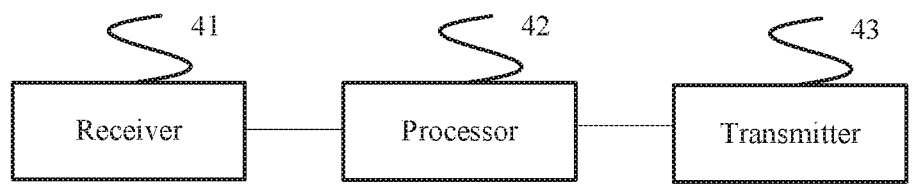
FIG. 16 is a schematic structural diagram of Embodiment 8 of an access device according to the present invention.

FIG. 16 is a schematic structural diagram of Embodiment 8 of an access device according to the present invention. As shown in FIG. 16, based on the structure of the access device shown in FIG. 15, the access device of this embodiment further includes a transmitter 43, where the transmitter 43 is configured to report a first discovery message to the source side access device, where the first discovery message is used to indicate the target side access device detected by the UE; and the processor 42 is further configured to detect the target side access device before the receiver 41 receives the access indication message sent by the source side access device.

In the foregoing embodiment, optionally, the access indication message includes: information used to indicate an access feature of the target side access device and information used to indicate a resource reserved by the target side access device for the UE.

In the foregoing embodiment, optionally, the access indication message is further used to: after the UE accesses the target side access device, instruct the UE to maintain the connection between the UE and the source side access device, or disconnect the connection between the UE and the source side access device.

Further, if indication information is used to: after the UE accesses the target side access device, instruct to disconnect the connection between the UE and the source side access device, the processor 42 is further configured to: after the access module accesses the target side access device, disconnect the connection between the UE and the source side access device.

In the foregoing embodiment, optionally, the receiver 41 is further configured to:

receive a first bearer transfer message sent by the source side access device, where the first bearer transfer message carries a bearer identifier of a bearer between the UE and the source side access device, and the bearer identifier is used to instruct the UE to transfer a bearer corresponding to the bearer identifier to the target side access device; or configured to receive a second bearer transfer message sent by the target side access device, where the second bearer transfer message is used to instruct the UE to transfer a bearer corresponding to a bearer identifier to the target side access device.

In the foregoing embodiment, the transmitter 43 is further configured to:

send a TFT, a PTI, and a bearer identifier of a bearer between the UE and the source side access device to the source side access device, where the TFT, the PTI, and the bearer identifier of the bearer between the UE and the source side access device are used by the source side access device to stop using a bearer that corresponds to the bearer identifier of the bearer between the UE and the source side access device to exchange data with the UE.

In the foregoing embodiment, the access indication message is further used to: after the UE accesses the target side access device, instruct the UE to enter a DRX mode, and the processor 42 is further configured to:

enter the DRX mode according to the access indication message to exchange data with the source side access device, or exchange data with the target side access device.

The access device of this embodiment may be configured to perform the technical solution of the method embodiment shown in FIG. 2, and an implementation principle thereof is similar, which is not described herein again.

In Embodiment 2 of a centralized control node in the present invention, an access device of this embodiment may include: a transmitter, where the transmitter is configured to send an access indication message to a source side access device, so that the source side access device sends the access indication message to the source side access device, where the access indication message is used to instruct the UE to access a target side access device; or configured to send a second notification message to a target side access device, where the second notification message is used to instruct the target side access device to send, to a UE, access information used to instruct the UE to access the target side access device.

Further, the access indication message includes: information used to indicate an access feature of the target side access device and information used to indicate a resource reserved by the target side access device for the UE.

Further, the access indication message is further used to: after the UE accesses the target side access device, instruct the UE to maintain a connection between the UE and the source side access device, or disconnect a connection between the UE and the source side access device.

In the foregoing embodiment, the access indication message is further used to: after the UE accesses the target side access device, instruct the UE to enter a DRX mode.

According to the centralized control node provided in this embodiment, a transmitter sends an access indication message to a source side access device, so that the source side access device sends the access indication message to the source side access device, where the access indication message is used to instruct the UE to access a target side access device, or the centralized control node sends a second notification message to a target side access device, where the second notification message is used to instruct the target side access device to send, to a UE, access information used to instruct the UE to access the target side access device. Therefore, in a process in which the UE accesses the target side access device, the source side access device maintains a connection between the UE and the source side access device; therefore, a service interruption is not caused.

Finally, it should be noted that the foregoing embodiments are merely intended for describing the technical solutions of the present invention, but not for limiting the present invention. Although the present invention is described in detail with reference to the aforementioned embodiments, persons of ordinary skill in the art should understand that they may still make modifications to the technical solutions described in the aforementioned embodiments or make equivalent replacements to some or all technical features thereof, without departing from the scope of the technical solutions of the embodiments of the present invention.

What is claimed:

1. An apparatus comprising:
one or more processors coupled with one or more memories storing instructions which, when executed by the one or more processors, cause the apparatus to:
receive from a source access device, an access indication message instructing the apparatus to access a target access device;
access the target access device according to the access indication message;
receive from the source access device, a bearer transfer message, wherein the bearer transfer message carries an identifier of a data bearer, and the data bearer is between the apparatus and the source access device; and
transfer the data bearer to be between the apparatus and the target access device, wherein a control plane or a user plane connection between the apparatus and the source access device is maintained.

2. The apparatus according to claim 1, wherein the bearer transfer message and the access indication message are in a same message.

3. The apparatus according to claim 1, wherein the instructions further cause the apparatus to:
detect the target access device; and
report, to the source access device, the target access device being detected.

4. The apparatus according to claim 1, wherein the access indication message includes an identifier of the target access device, and information about a resource reserved by the target access device for the apparatus.

5. The apparatus according to claim 1, wherein the access indication message includes information for instructing the apparatus to enter a discontinuous reception (DRX) mode.

6. The apparatus according to claim 1, wherein the access indication message further instructs the apparatus to maintain the control plane or the user plane connection between the apparatus and the source access device.

7. The apparatus according to claim 1, wherein the apparatus is a terminal device.

8. A method comprising:
receiving, by a terminal device from a source access device, an access indication message instructing the terminal device to access a target access device;
accessing, by the terminal device, the target access device according to the access indication message;
receiving, by the terminal device from the source access device, a bearer transfer message, wherein the bearer transfer message carries an identifier of a data bearer, and the data bearer is between the terminal device and the source access device; and
transferring, by the terminal device, the data bearer to be between the terminal device and the target access device, wherein a control plane or a user plane connection between the terminal device and the source access device is maintained.

9. The method according to claim 8, wherein the bearer transfer message and the access indication message are in a same message.

10. The method according to claim 8, further comprising:
  detecting, by the terminal device, the target access device; and
  reporting, by the terminal device to the source access device, the target access device being detected.

11. The method according to claim 8, wherein the access indication message includes an identifier of the target access device, and information about a resource reserved by the target access device for the terminal device.

12. The method according to claim 8, wherein the access indication message includes information for instructing the terminal device to enter a DRX mode.

13. The method according to claim 8, wherein the access indication message further instructs the terminal device to maintain the control plane or the user plane connection between the terminal device and the source access device.

14. An apparatus comprising:
  one or more processors coupled with one or more memories storing instructions which, when executed by the one or more processors, cause the apparatus to:
  send, to a terminal device, an access indication message instructing the terminal device to access a target access device;
  send, to the terminal device, a bearer transfer message, wherein the bearer transfer message carries an identifier of a data bearer, and the data bearer is between the terminal device and a source access device; and
  maintain a control plane or a user plane connection with the terminal device.

15. The apparatus according to claim 14, wherein the bearer transfer message and the access indication message are in a same message.

16. The apparatus according to claim 14, wherein the instructions further cause the apparatus to:
  exchange information with the target access device, wherein the information includes an identifier of the target access device, and information about a resource reserved by the target access device for the terminal device.

17. The apparatus according to claim 14, wherein the access indication message includes the identifier of the target access device, and information about a resource reserved by the target access device for the terminal device.

18. The apparatus according to claim 14, wherein the access indication message includes information for instructing the apparatus to enter a DRX mode.

19. The apparatus according to claim 14, wherein the access indication message further instructs the terminal device to maintain the control plane or the user plane connection between the apparatus and the terminal device.

* * * * *